US012657604B2

(12) United States Patent
Raghavan et al.

(10) Patent No.:    US 12,657,604 B2
(45) Date of Patent:        Jun. 16, 2026

(54) ONLINE PRODUCT OR SERVICE SEARCH WITH AUTOMATIC CONTEXTUAL PRODUCT OR SERVICE NEWS TO INFLUENCE SELECTION/TIMING OF PURCHASE

(71) Applicant: MOTOROLA MOBILITY LLC, Wilmington, DE (US)

(72) Inventors: Krishnan Raghavan, Bangalore (IN); Prasad A G, Bangalore (IN); Vijayprakash Idlur, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/887,435

(22) Filed: Sep. 17, 2024

(65) Prior Publication Data

US 2026/0080436 A1     Mar. 19, 2026

(51) Int. Cl.
*G06Q 30/02*        (2023.01)
*G06Q 30/0251*    (2023.01)
*G06Q 30/0601*    (2023.01)

(52) U.S. Cl.
CPC ..... *G06Q 30/0253* (2013.01); *G06Q 30/0625* (2013.01); *G06Q 30/0641* (2013.01)

(58) Field of Classification Search
CPC ........... G06Q 30/0253; G06Q 30/0625; G06Q 30/0207–30/0277
See application file for complete search history.

(56) References Cited

U.S. PATENT DOCUMENTS

| | | | | |
|---|---|---|---|---|
| 8,200,580 | B1 * | 6/2012 | Grinchenko | ........ G06F 21/6218 705/50 |
| 8,458,160 | B2 * | 6/2013 | Krishnamoorthy | .... G06Q 50/01 707/706 |
| 10,002,371 | B1 * | 6/2018 | Baker | ............... G06F 16/24578 |
| 2005/0080684 | A1 * | 4/2005 | Blum | ................ G06Q 30/0633 705/26.8 |
| 2008/0270255 | A1 * | 10/2008 | Milone | ................. G06Q 40/12 705/37 |
| 2009/0037412 | A1 * | 2/2009 | Bard | ..................... G06F 16/285 707/999.005 |
| 2011/0010307 | A1 * | 1/2011 | Bates | .................... G06Q 30/02 705/26.7 |

(Continued)

*Primary Examiner* — Thuy N Nguyen
(74) *Attorney, Agent, or Firm* — Isidore PLLC

(57)        ABSTRACT

An electronic system, a method, and a computer program product select and provide published reliable information articles that are contextually appropriate and authoritative to influence selection and timing of purchase of a product identified as of interest to a user. The electronic system includes at least one electronic device that detects, via input device(s), user input(s) by a user indicating a current interest in purchasing a product or service. The electronic system activates an electronic search to identify, in published information source(s), relevant article(s) containing product or service information associated with the product or service. The electronic system presents, via output device(s), a purchase interface section indicating the product or service and at least a portion of or a link to the product or service information from the relevant article(s), to influence timing of a purchase decision for the product or service by the user.

20 Claims, 8 Drawing Sheets

(56) References Cited

U.S. PATENT DOCUMENTS

| | | | | |
|---|---|---|---|---|
| 2011/0288925 A1* | 11/2011 | Thomas | ............. | G06Q 30/0201 |
| | | | | 705/14.25 |
| 2012/0059848 A1* | 3/2012 | Krishnamoorthy | .... | G06Q 50/01 |
| | | | | 709/204 |
| 2013/0138510 A1* | 5/2013 | Carnevali | .......... | G06Q 30/0261 |
| | | | | 705/14.58 |
| 2016/0196579 A1* | 7/2016 | Koura | ................ | G06Q 30/0275 |
| | | | | 705/14.53 |
| 2018/0047071 A1* | 2/2018 | Hsu | .................... | G06Q 30/0282 |
| 2019/0244222 A1* | 8/2019 | Rathod | ................... | G06F 16/58 |
| 2019/0370824 A1* | 12/2019 | Rathod | ................. | G06Q 30/02 |
| 2020/0302006 A1* | 9/2020 | Bhide | ................... | G06F 40/117 |
| 2023/0092351 A1* | 3/2023 | Watanabe | ........ | G06Q 10/06315 |
| | | | | 705/7.29 |
| 2024/0370915 A1* | 11/2024 | Ferguson | ........... | G06Q 30/0633 |

* cited by examiner

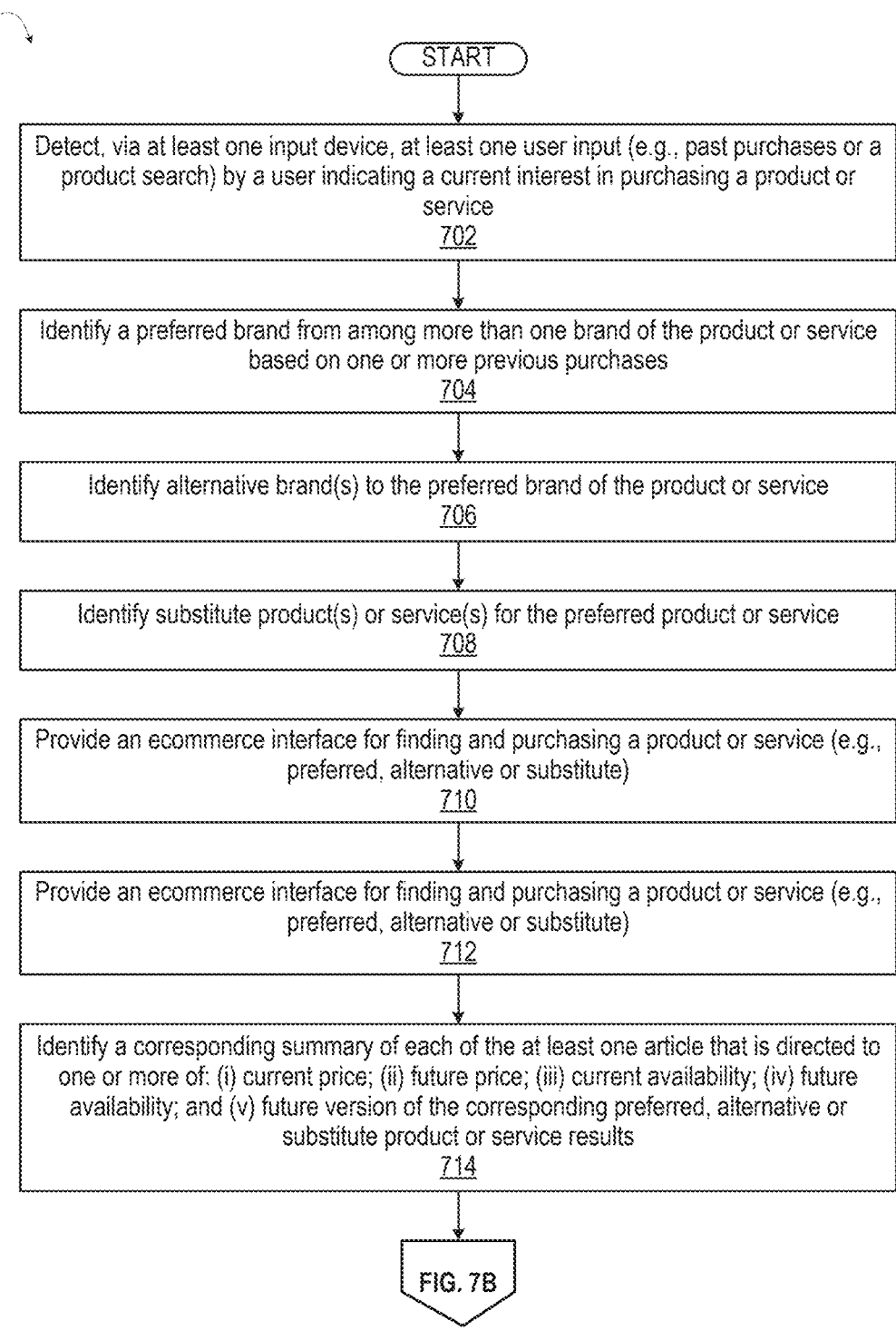

700

START

Detect, via at least one input device, at least one user input (e.g., past purchases or a product search) by a user indicating a current interest in purchasing a product or service
702

Identify a preferred brand from among more than one brand of the product or service based on one or more previous purchases
704

Identify alternative brand(s) to the preferred brand of the product or service
706

Identify substitute product(s) or service(s) for the preferred product or service
708

Provide an ecommerce interface for finding and purchasing a product or service (e.g., preferred, alternative or substitute)
710

Provide an ecommerce interface for finding and purchasing a product or service (e.g., preferred, alternative or substitute)
712

Identify a corresponding summary of each of the at least one article that is directed to one or more of: (i) current price; (ii) future price; (iii) current availability; (iv) future availability; and (v) future version of the corresponding preferred, alternative or substitute product or service results
714

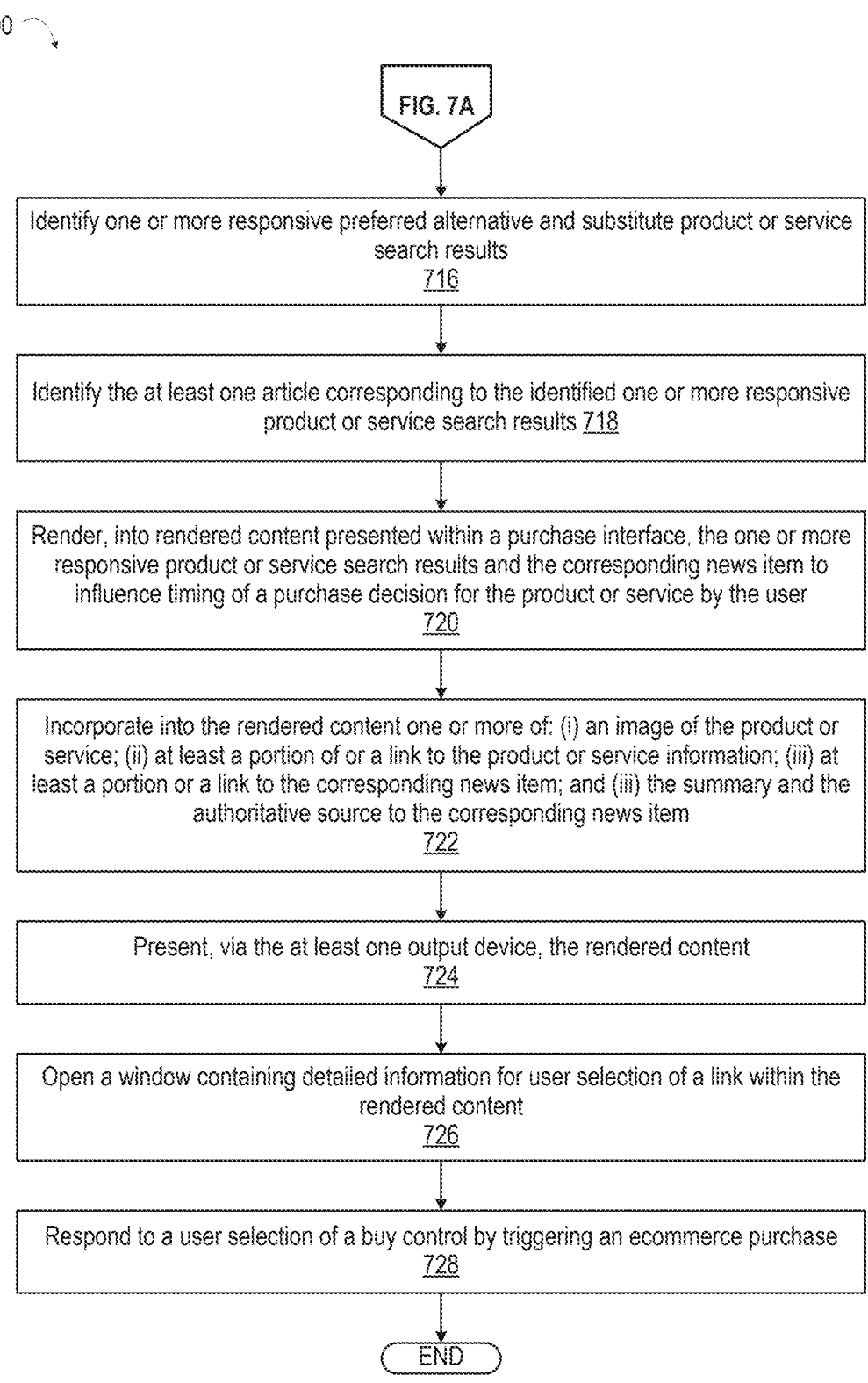

FIG. 7A

Identify one or more responsive preferred alternative and substitute product or service search results
716

Identify the at least one article corresponding to the identified one or more responsive product or service search results 718

Render, into rendered content presented within a purchase interface, the one or more responsive product or service search results and the corresponding news item to influence timing of a purchase decision for the product or service by the user
720

Incorporate into the rendered content one or more of: (i) an image of the product or service; (ii) at least a portion of or a link to the product or service information; (iii) at least a portion or a link to the corresponding news item; and (iii) the summary and the authoritative source to the corresponding news item
722

Present, via the at least one output device, the rendered content
724

Open a window containing detailed information for user selection of a link within the rendered content
726

Respond to a user selection of a buy control by triggering an ecommerce purchase
728

END

FIG. 7B

ONLINE PRODUCT OR SERVICE SEARCH WITH AUTOMATIC CONTEXTUAL PRODUCT OR SERVICE NEWS TO INFLUENCE SELECTION/TIMING OF PURCHASE

BACKGROUND

1. Technical Field

The present disclosure relates generally to electronic devices having a display for presenting a user interface, and more particularly to electronic devices having a display that presents a user interface for browsing and purchasing goods and services.

2. Description of the Related Art

As technology has advanced, uses for electronic devices have expanded to include ecommerce purchases. A large number of products are available for purchase and delivery. Ecommerce services have created searchable inventories of these products for review via electronic devices such as desktop computers, laptops, notebooks, and smartphones. Hierarchical organization of products and flexible querying features generally enable users to find the products that they want. In addition, users of electronic devices increasingly rely upon ecommerce services to learn the brand preferences of a particular user and to suggest appropriate products also based on reviews by other purchasers. Users make purchases in part based on this hindsight knowledge provided by ecommerce services.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 7A-7B (collectively "FIG. 7") are a flow diagram presenting a method for selecting and providing published reliable information articles that is contextually appropriate and authoritative to influence selection and timing of purchase of a product or service identified as being of interest to a user, according to one or more embodiments.

DETAILED DESCRIPTION

Figure 1:
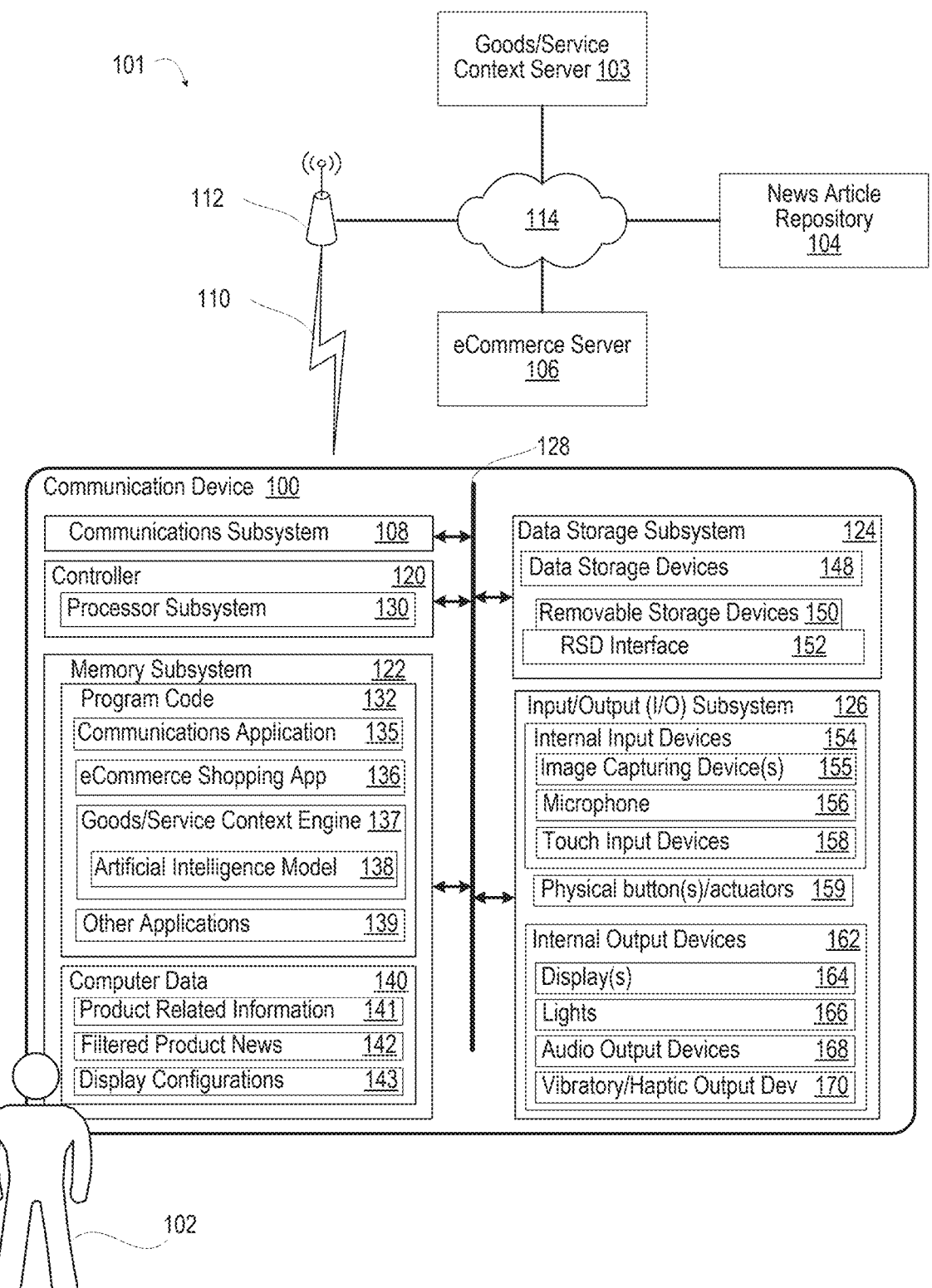
FIG. 1 presents a simplified functional block diagram of an electronic device in which the features of the present disclosure are advantageously implemented for browsing and selecting products and services enhanced by presenting associated contextual information that is published and reliable to inform a purchase decision, according to one or more embodiments.

According to aspects of the present disclosure, an electronic system, a method and a computer program product select and provide published reliable information that is contextually appropriate and authoritative to influence selection and timing of purchase of a product identified as being of interest to a user. By providing the published reliable information that is contextually appropriate and authoritative, an ecommerce service can assist users in making better purchase decisions based on awareness of future price and availability of products. The user benefits by avoiding buyer's remorse. In one or more embodiments, an electronic system includes at least one electronic device. Each electronic device includes at least one input device, at least one output device, a communications subsystem that connects the electronic device to at least one online information source, and a controller. The controller is communicatively coupled to the at least one input device, the at least one output device and the communications subsystem. The controller is configured to cause the at least one electronic device to detect, via the at least one input device, at least one user input by a user indicating a current interest in purchasing a product or service. The controller is configured to cause the at least one electronic device to activate an electronic search to identify, in one or more public information source, at least one article containing product or service information associated with the product or service of interest to the user. Third-party news may broadly include free or subscription-based publicly available information from a recognizable author, publicist, distributor, editor, website, organization or institution. The published reliable information may be referred to as "news" as being relevant to current and predicted purchase conditions and not merely of historical significance. The controller is configured to cause the at least one electronic device to present, via the at least one output device, a purchase interface section indicating the product or service and at least a portion of or a link to the product or service information from the at least one article, to influence timing of a purchase decision for the product or service by the user.

According to aspects of the present disclosure, the electronic system, method and computer program product provide enhanced suggestions to a user by adding foresight knowledge to make a better purchase decision with reduced chances of later regret when unforeseen conditions arise. A user may consider several parameters in making a decision to buy or not buy. In an example, prices may fluctuate on specific articles within online shopping platforms. Often, consumers may wait to make a purchase, hoping for a price drop, only to find that prices have increased when they finally decide to buy. Conversely, the consumers might make a purchase, only to witness a subsequent price reduction. Equally, there are other parameters such as new upcoming model launches, new technology upgrades, new brands coming in or existing brands existing, etc., that can influence the decision. Availability of preferred and substitute products can also change abruptly. In an example, fresh tomatoes may be a preferred product whose price goes up and availability goes down due to unseasonable weather, forcing use of substitute canned products. However, after a brief period of time, the price and availability may rapidly improve after governmental or private actions to increase imports at a reasonable price.

Investigating through external information sources could potentially provide crucial insights enabling the consumer to arrive at a sound decision regarding purchasing and timing of purchasing of products or services. Examples of external information sources include print, audio and video news reports, magazine articles, academic publications, press releases, reviews, correspondence, book excerpts, blogs, newspapers columns, and government reports. As used herein, news and/or information may include any piece of information having an identifiable source that contains any type of information relevant to current and at least near-term conditions to goods or services. External news is perceived as more reliable than internal shopping site trends, enhancing consumer confidence in the consumer's decisions. However, this approach is time-consuming and easily forgotten. This failure to research before making purchases can lead to regrettable decisions for the users, and over time, businesses bear the brunt as users might shy away from committing to a purchase. Automatically bringing credible news related to products or services for users' consumption when the users are interested in a product or service is a problem worth solving for users and businesses alike.

The present disclosure provides a device, a system, a method, and a computer program product for automatically and contextually surfacing news/information related to products and/or services that a user is interested in. The context includes price, availability and quality of the subject matter (i.e., product or service) and the current timing of the purchase decision, and older publications are generally not considered as relevant "news". This approach builds on the fact that externally sourced purchase-related news is likely to be seen as more credible by users in making a purchase decision as compared to predictions shown by the ecommerce shopping services themselves. By bridging the gap between external information and shopping behavior, the present disclosure assists with mitigating buyer's remorse and enhances shopping experiences that involve the user's electronic device in many instances.

As one example implementation, in one or more embodiments, the present disclosure provides the following series of functions/features:

1. Determining user interest in a product or service;
2. Detecting recent news related to the product or service from a news server;
3. Determining the product sentiment from each of the news article, the sentiment including one or more of (a) price; (b) new upcoming models; and (c) new upcoming technology;
4. Determining if the news article should be presented to the user along with product information relevant to an immediate purchase (e.g., news predicting a change in price within a period of time); and
5. Presenting the news article along with the product information.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements can be provided with similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic device in which the features of the present disclosure are advantageously implemented for browsing and selecting products and services enhanced by presenting associated contextual news articles that inform a purchase decision. The news articles are contextually appropriate and authoritative to influence selection and timing of purchase of a product or service identified as of interest to a user. In one or more embodiments, the electronic device includes additional communications functionality that enables electronic device to be referred to as communication device 100, which operates as a mobile user device for user 102 in communication environment 101. Aspects of the present disclosure may be implemented at least in part in goods/services context server(s) 103 that includes some or all of the components and functionality described herein. In the specific example of FIG. 1, communication environment 101 includes one or more information repository 104 and ecommerce server 106, which are accessible to communication device 100 through communication network 114. In some embodiments, information repository 104 provides news articles related to products and services, whose purchase information are available in one or more ecommerce server 106. Communications device 100 includes communications subsystem 108 that connects via wired or wireless channel 110 to node 112 (e.g., wireless access point, cellular tower) to communicatively connect to information repository 104 and ecommerce server 106 via one or more communication network 114. Controller 120 is configured to cause communication device 100 to perform functionality of the present disclosure for selecting and providing news articles from information repository 104 that are contextually appropriate and authoritative to influence selection and timing of purchase of a product via ecommerce server 106 identified as being of interest to user 102.

Communication device 100 can be one of a host of different types of devices, including but not limited to, a mobile cellular phone, satellite phone, or smart phone, a laptop, a netbook, an ultra-book, a networked smartwatch, or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a session initiation protocol (SIP) phone, a wireless local loop (WLL) station, a personal digital assistant (PDA), computer workstation, a handheld device having wireless connection capability, a computing device, or other processing devices. User 102 may use one or more second electronic devices similar or identical to communication device 100 with preferences shared across devices.

In addition to communications subsystem 108 and controller 120, communication device 100 may include memory subsystem 122, data storage subsystem 124 and input/output (I/O) subsystem 126. To enable management by controller 120, system interlink 128 communicatively connects controller 120 with communications subsystem 108, memory subsystem 122, data storage subsystem 124 and I/O subsystem 126. System interlink 128 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 128) are illustrated in FIG. 1, it is to be understood that more, fewer, or different interconnections may be present in other embodiments.

Controller 120 includes processor subsystem 130, which includes one or more central processing units (CPUs) or data processors. Processor subsystem 130 can include one or more digital signal processors and graphics processing units (GPUs), etc. that can be integrated with data processor(s). Processor subsystem 130 can include other processors such as auxiliary processor(s) that may act as a low power consumption, always-on sensor hub for physical sensors. Controller 120 manages, and in some instances directly controls, the various functions and/or operations of communication device 100. These functions and/or operations include, but are not limited to including, application data processing, communication, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Memory subsystem 122 stores program code 132 for execution by processor subsystem 130 to provide the functionality described herein. Program code 132 includes applications such as communications application 135, ecommerce shopping application 136, good/service context engine 137 that may include artificial intelligence model 138, and other applications 139.

In one or more embodiments, several of the described aspects of the present disclosure are provided via executable program code of applications executed by controller 120. In one or more embodiments, program code 132 may be integrated into a distinct chipset or hardware module as firmware that operates separately from executable program code. Portions of program code 132 may be incorporated into different hardware components that operate in a distributed or collaborative manner. Memory subsystem 122 further includes operating system (OS), firmware interface, such as basic input/output system (BIOS) or Uniform Extensible Firmware Interface (UEFI), and firmware, which also includes and may thus be considered as program code 132.

Program code 132 may access, use, generate, modify, store, or communicate computer data 140, such as product related information 141, filtered product news 142, and display configurations 143 that supports, and is updated by, goods/service context engine 137. An example implementation of goods/service context engine 137 is described below with regard to FIG. 2. With continued reference to FIG. 1, computer data 140 may incorporate "data" that originated as raw, real-world "analog" information that consists of basic facts and figures. Computer data 140 includes different forms of data, such as numerical data, images, coding, notes, and financial data. Computer data 140 may originate at communication device 100 or be retrieved from a remote device via communications subsystem 108. Communication device 100 may store, modify, present, or transmit computer data 140, such as product related information 141. Computer data 140 may be organized in one of a number of different data structures. Common examples of computer data 140 include video, graphics, text, and images. Computer data 140 can also be in other forms of flat files, databases, and other data structures.

Data storage subsystem 124 of communication device 100 includes data storage device(s) 148. Controller 120 is communicatively connected, via system interlink 128, to data storage device(s) 148. Data storage subsystem 124 provides program code 132 and computer data 140 stored on non-volatile storage that is accessible by controller 120. For example, data storage subsystem 124 can provide a selection of program code 132 and computer data 140. These applications can be loaded into memory subsystem 122 for execution/processing by controller 120. In one or more embodiments, data storage device(s) 148 can include hard disk drives (HDDs), optical disk drives, and/or solid-state drives (SSDs), etc. Data storage subsystem 124 of communication device 100 can include removable storage device(s) (RSD(s)) 150, which is received in RSD interface 152. Controller 120 is communicatively connected to RSD 150, via system interlink 128 and RSD interface 152. In one or more embodiments, RSD 150 is a non-transitory computer program product or computer readable storage device that stores program code and/or instructions that may be executed by a processor associated with a user device such as communication device 100. Controller 120 can access data storage device(s) 148 or RSD 150 to provision communication device 100 with program code 132 and computer data 140.

I/O subsystem 126 may include internal input devices 154 such as image capturing device(s) 155, microphone 156, and touch input devices 158 (e.g., screens, keys, or buttons). I/O subsystem 126 may include physical buttons/actuators 159 that can be located on a periphery of the device housing. I/O subsystem 126 may include internal output devices 162 such as display(s) 164, lights 166, audio output devices 168, and vibratory or haptic output devices 170.

In one or more embodiments, controller 120, via communications subsystem 108, performs multiple types of cellular over-the-air (OTA) connections. In one or more embodiments, controller 120, via communications subsystem 108, may communicate via an OTA cellular connection with radio access networks (RANs). In an example, communication device 100, via communications subsystem 108, connects via RANs of a terrestrial network that is communicatively connected to a network server. In one or more embodiments, controller 120, via communications subsystem 108, communicates via a wireless local area network (WLAN) link using one or more IEEE 802.11 WLAN protocols with an access point. In one or more embodiments, controller 120, via communications subsystem 108, performs other types of wireless communication, such as by using a Bluetooth connection or other personal access network (PAN) connection. In an example, a user may wear a health monitoring device such as a smartwatch that is communicatively coupled to communication device 100 via a wireless connection. In one or more embodiments, communications subsystem 108 includes a global positioning system (GPS) module that receives GPS broadcasts from GPS satellites to obtain geospatial location information, which enables communication device 100 to self-locate, among other features.

In one or more embodiments, goods/service context engine 137 includes artificial intelligence (AI) model 138 that is trained to recognize news articles that predict a change in price, availability, or quality of a product, good or service as well as articles that provide alternatives for products, good, or service. The alternatives may be recommended in lieu of the product, good, or service of interest to the user because of one or more factors, such as but not limited to a shortage or unavailability of the user desired products, good, or service, a better price, better quality, other news-related reasons for selecting the alternatives, etc. AI model 138 may also be trained to recognize preferences of user 102 to identify whether user 102 is inclined toward value or toward quality and other inclinations. Goods/service context engine 137 and AI model 138 may be stored in memory subsystem 122 of communication device 100 and executed by controller 120 to perform various aspects of the functionality of the present disclosure. Training of AI model 138 is the process by which AI models are trained to perform specific tasks or achieve certain objectives. The training involves providing the model with a large amount of data and allowing the model to learn from patterns and relationships within that data. Controller 120 may include various functionalities that enable controller 120 to perform different aspects of AI models. AI models may include an artificial neural network, a decision tree, a support vector machine, Hidden Markov model, linear regression, logistic regression, Bayesian networks, and so forth. The AI models can be individually trained to perform specific tasks and can be arranged in different sets of AI models to generate different types of output.

According to aspects of the present disclosure, controller 120 is configured to cause communication device 100 to detect, via at least one input device such as microphone 156 or touch input device 158, or selection via physical buttons/actuators 159, at least one input by user 102 indicating a current interest in purchasing a product or service. Controller 120 is configured to cause communication device 100 to activate an electronic search to identify, in one or more third-party information sources such as information repository 104, at least one news article containing product or service information associated with the product or service. Controller 120 is configured to cause communication device 100 to present, via the at least one output device, such as display 164, a purchase display indicating the product or service and at least a portion of or a link to the product or service information from the at least one article, to influence timing of a purchase decision for the product or service by user 102.

In one or more embodiments, controller 120 is configured to cause communication device 100 to identify a preferred brand from among more than one brand of the product or service based on one or more previous purchases. Controller 120 is configured to cause communication device 100 to identify the at least one article associated with a change in at least one of price and availability of the preferred brand of the product or service.

In one or more embodiments, controller 120 is configured to cause communication device 100 to identify at least one substitute product or service. Controller 120 is configured to cause communication device 100 to identify the at least one article associated with at least one of price and availability of one or more of the product or service and the at least one substitute product or service.

In one or more embodiments, controller 120 is configured to cause communication device 100 to identify a current version of the product or service that is available for purchase. Controller 120 is configured to cause communication device 100 to identify the at least one article associated with a future version of the product or service that will be available for purchase at a later date. Controller 120 is configured to cause communication device 100 to present the at least one article to influence timing of the purchase decision for the current version at or after a current date or the future version of the product or service at or after the later date.

In one or more embodiments, controller 120 is configured to cause communication device 100 to identify a corresponding summary of each of the at least one article that is directed to one or more of: (i) current price of the product or service; (ii) future price of the product or service; (iii) current availability of the product or service; (iv) future availability of the product or service; and (v) future version of the product or service. Controller 120 is configured to cause communication device 100 to present, via the at least one output device, the at least one article with the corresponding summary.

In one or more embodiments, controller 120 is configured to cause communication device 100 to identify a corresponding authoritative source for each of the at least one article. Controller 120 is configured to cause communication device 100 to present, via the at least one output device, the at least one article with the corresponding authoritative source.

In one or more embodiments, controller 120 is configured to cause communication device 100 to detect the at least one user input by the user indicating the current interest in purchasing the product or the service, based on detecting a current product or service search. Controller 120 is configured to cause communication device 100 to identify one or more responsive product or service search results. Controller 120 is configured to cause communication device 100 to identify the at least one article for at least one of the one or more responsive product or service search results. Controller 120 is configured to cause communication device 100 to render the one or more responsive product or service search results along with the at least one article into rendered content. Controller 120 is configured to cause communication device 100 to present, via the at least one output device, the rendered content.

Figure 2:
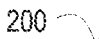
FIG. 2 is a communication diagram of a goods/service context engine of the communication device of FIG. 1 implemented to contextually associate published information to an identified product of interest to a user, according to one or more embodiments.
Figure 2:
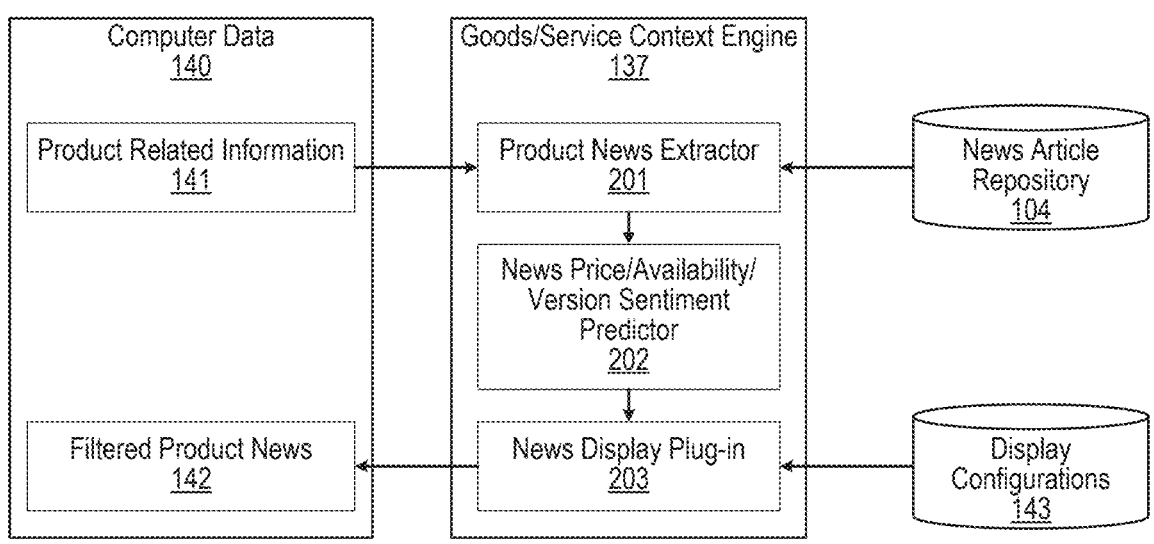

FIG. 2 presents a communication diagram 200 of goods/service context engine 137 implemented to contextually associate product news to an identified product of interest to user 102 (FIG. 1). In one or more embodiments, goods/service context engine 137 may be implemented in goods/service context server(s) 103 (FIG. 1). Product news extractor 201 of goods/service context engine 137 detects that product related information 141 has been retrieved and is stored in computer data 140 during browsing or shopping activities. Product news extractor 201 retrieves news articles from news article repository 104 and communicates the news articles to news price/availability/version (PAV) sentiment predictor 202 of goods/service context engine 137 to select news articles that predict a change in price, availability, or feature/quality version that may affect timing of a purchase. News display plug-in 203 of goods/service context engine 137 accesses display configurations 143 to identify triggers for displaying the news sentiment prediction from news PAV sentiment predictor 202. In an example, the news predicts how one or more of price, availability, quality, will change over a specified time period. Display configurations 143 may also specify how display constraints of a particular configuration of communication device 100 constrains presentation of news articles. News display plugin 203 generates filtered product news 142 for storing in computer data 140 based on inputs from news PAV sentiment predictor 202 and display configurations 143.

Figure 3:
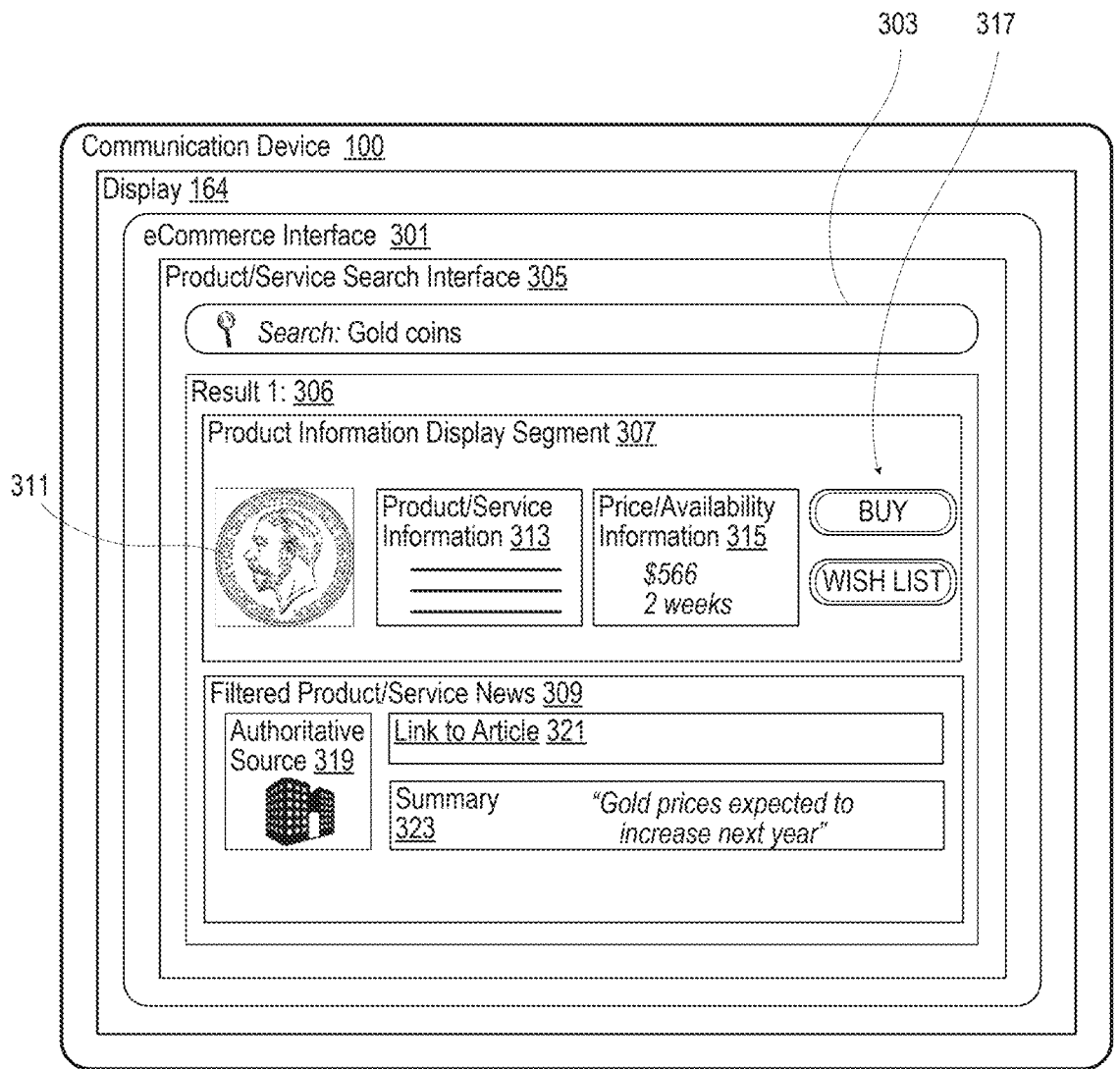
FIG. 3 is a front view of a display of the communication device presenting an ecommerce display having a product/service search option for querying, selecting, browsing, and purchasing product and service offerings from one or more ecommerce services presented adjacent to contextually appropriate information that is published and reliable to influence a purchase decision, according to one or more embodiments.

FIG. 3 is a front view of display 164 of communication device 100 presenting ecommerce interface 301 having a product/service search interface section 305. Product/service search interface section 305 has query controls 303 for querying, selecting, browsing, and purchasing product and service offerings. In the example, results interface section 306 presents product/service information display segment 307 along with filtered product/service news display segment 309 that is contextually associated with the product/service information display segment 307. In an example, product query controls 303 includes an entered search for "gold coins". Product/service information display segment 307 includes product image 311 of found gold coin(s), product/service information 313 about the found gold coin(s), price/availability information 315 for the found gold coin(s), and purchase controls 317. According to aspects of the present disclosure, communication device 100 also presents filtered product/service news display segment 309, which is associated with the product/service information and predicts a change in price, availability, or quality that may affect a purchase decision. Specifically, example filtered product/service news display segment 309 includes authoritative source information 319, a link to or excerpt from article 321, and purchase prediction summary 323 (e.g., "gold prices expected to increase next year") extracted from the article. User selection, by clicking on either authoritative source information 319 or link to article 321 can open a separate window that provides the entire article or website from which the article originates.

Figure 4:
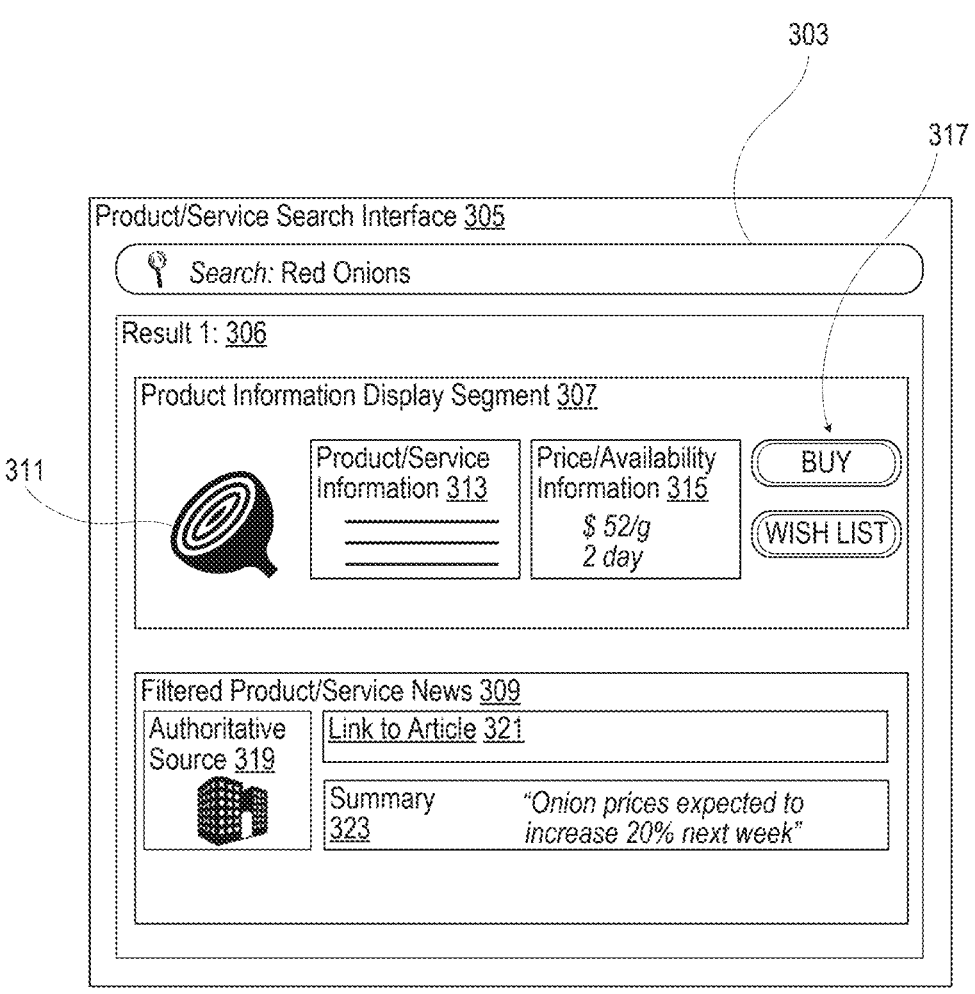
FIG. 4 is a product/service search interface section presenting product/service information and filtered product/service news of a predicted short-term price increase that is contextually associated with the product/service information, according to one or more embodiments.

FIG. 4 presents product/service search interface section 305 presenting results interface section 306 as described above for FIG. 3 after another query. Product query controls 303 includes an entered search for "red onions". Product/service information display segment 307 includes product image 311 of found red onions(s), product/service information 313 about the found red onions(s), price/availability information 315 for the found red onion(s), and purchase controls 317. According to aspects of the present disclosure, communication device 100 also presents filtered product/service news display segment 309, which is associated with the product/service information and predicts a change in price, availability, or quality that may affect a purchase decision. Specifically, example filtered product/service news display segment 309 includes authoritative source information 319, a link to or excerpt from article 321, and purchase prediction summary 323 (e.g., "onion prices expected to 20% next week") extracted from the article. User selection, by clicking on either authoritative source information 319 or link to article 321 can open a separate window that provides the entire article or website from which the article originates.

Figure 5:
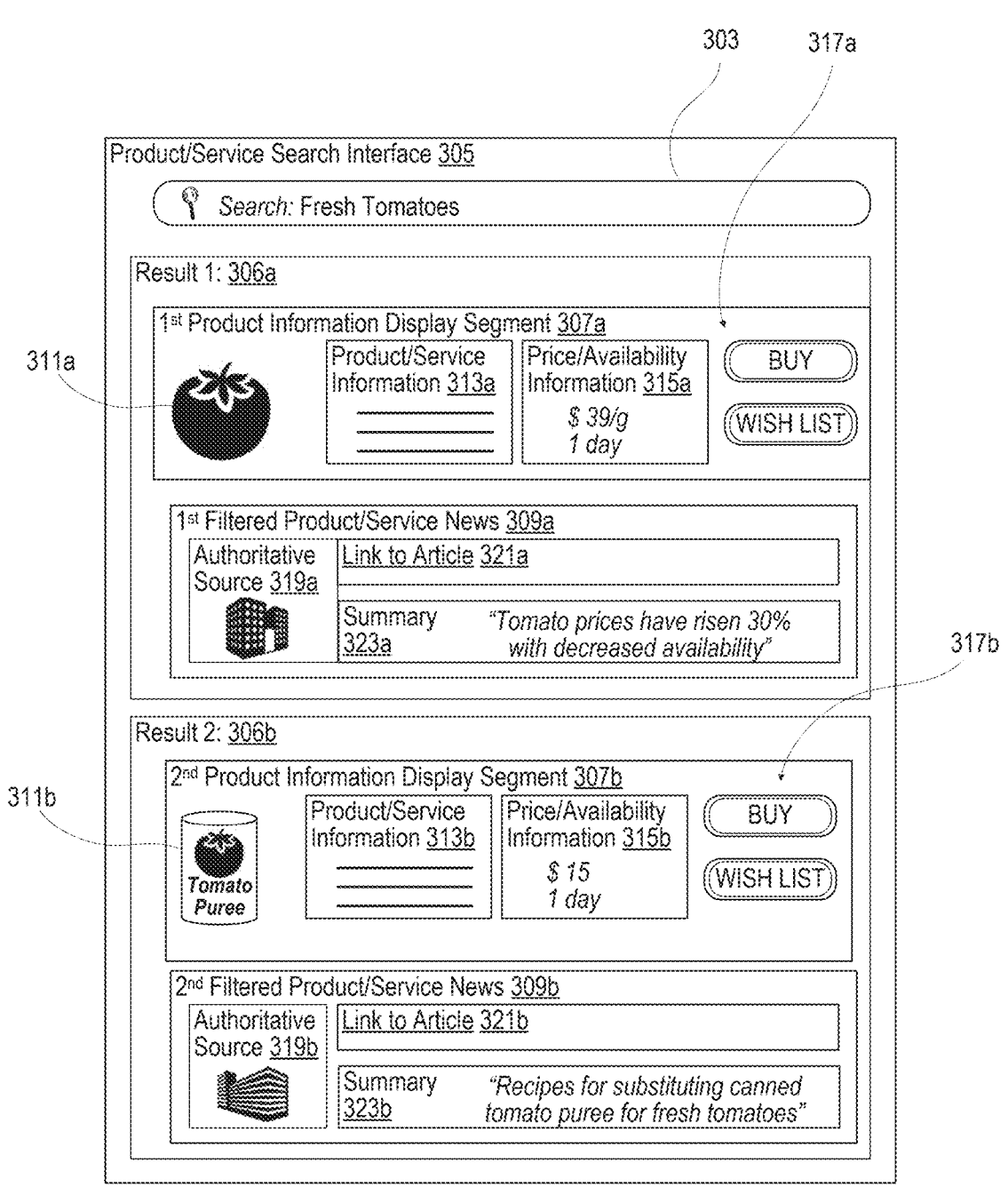
FIG. 5 is a product/service search interface section presenting preferred and substitute product/service information and filtered product/service news that is contextually associated with the corresponding product/service information, according to one or more embodiments.

FIG. 5 presents product/service search interface section 305 presenting results display 306a similar to as described above for FIGS. 3 and 4 after another query. Product query controls 303 includes an entered search for "fresh tomatoes". First product/service information display segment 307a includes first product image 311a of found fresh tomatoes, first product/service information 313a about the found fresh tomatoes, first price/availability information 315a for the found fresh tomatoes, and first purchase controls 317a. According to aspects of the present disclosure, communication device 100 also presents first filtered product/service news display segment 309a, which is associated with first product/service information 313a and predicts a change in price, availability, or quality that may affect a purchase decision. Specifically, example first filtered product/service news display segment 309a includes first authoritative source information 319a, a link to or excerpt from first article 321*a*, and purchase prediction summary 323*a* (e.g., "tomato prices have recently risen 30% due to poor weather conditions with no price decrease expected") extracted from the article. User selection, by clicking on either first authoritative source information 319*a* or link to first article 321*a* can open a separate window that provides the entire article or website from which the article originates.

According to another aspect of the present disclosure, further in response to the query for a preferred brand or type of goods or service, communication device 100 may also search for alternative brands for the same goods or service or search for substitute types of the goods or service presented as results display 306*b*. In one or more embodiments, the price increase for the preferred brand of goods or service may trigger searching for the alternative or substitute goods or service presented as results display 306*b*. In an example, second product/service information display segment 307*b* includes second product image 311*b* of found canned tomato puree, second product/service information 313*b* about the found canned tomato puree, second price/availability information 315*b* for the found canned tomato puree, and second purchase controls 317*b*. According to aspects of the present disclosure, communication device 100 also presents second filtered product/service news display segment 309*b*, which is associated with second product/service information 313*b* and suggests an alternative or substitute goods or service with a corresponding change in price, availability, or quality from the preferred brand that may affect a purchase decision. Specifically, example second filtered product/service news display segment 309*b* includes second authoritative source information 319*b*, a link to or excerpt from second article 321*b*, and purchase prediction summary 323*b* (e.g., "recipes for substituting canned tomato puree for fresh tomatoes") extracted from the article. User selection, by clicking on either second authoritative source information 319*b* or link to second article 321*b* can open a separate window that provides the entire article or website from which the article originates. The user is presented with authoritative information to assist in choices that emphasize quality or price.

Figure 6:
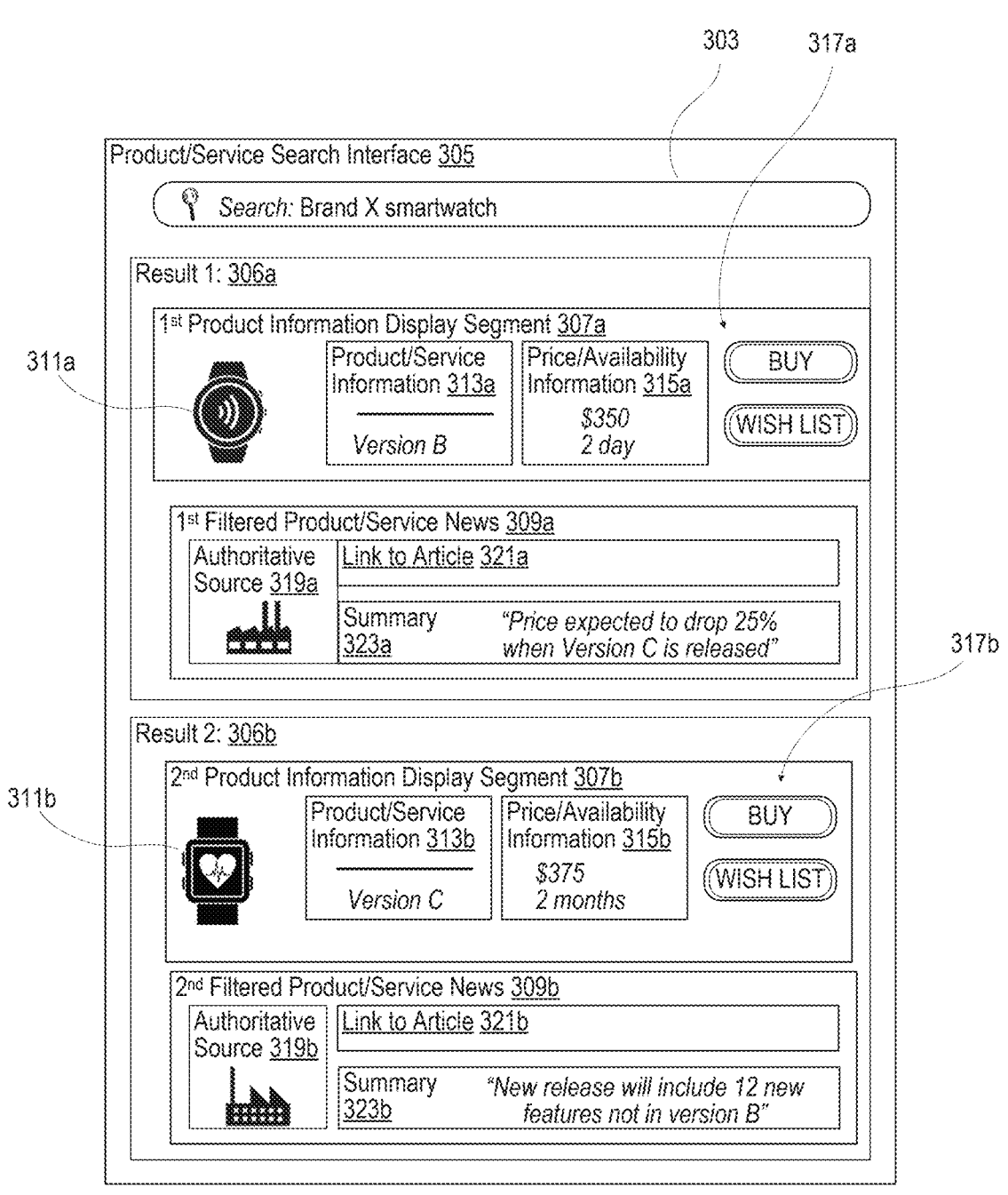
FIG. 6 is a product/service search interface section presenting current and upgraded brand product/service information and filtered product/service news that is contextually associated with the corresponding brand product/service information, according to one or more embodiments.

FIG. 6 presents product/service search interface section 305 presenting results display 306*a* similar to as described above for FIGS. 3, 4 and 5 after another query. Product query controls 303 includes an entered search for "brand X smartwatch". First product/service information display segment 307*a* includes first product image 311*a* of found Brand X smartwatch version B, first product/service information 313*a* about the found Brand X smartwatch version B, first price/availability information 315*a* for the found Brand X smartwatch version B, and first purchase controls 317*a*. According to aspects of the present disclosure, communication device 100 also presents first filtered product/service news display segment 309*a*, which is associated with first product/service information 313*a* and predicts a change in price, availability, or quality that may affect a purchase decision. Specifically, example first filtered product/service news display segment 309*a* includes first authoritative source information 319*a*, a link to or excerpt from first article 321*a*, and purchase prediction summary 323*a* (e.g., "Price expected to drop 25% when Version C is released") extracted from the article. User selection, by clicking on either first authoritative source information 319*a* or link to first article 321*a* can open a separate window that provides the entire article or website from which the article originates.

According to another aspect of the present disclosure, further in response to the query for a preferred brand or type of goods or service, communication device 100 may also search for changes in quality for the preferred brand queried for the same goods or service presented as results display 306*b*. In one or more embodiments, a brand is a technological, electronic, scientific, nutritional, or medicinal product that is improved over time. In an example, second product/service information display segment 307*b* includes second product image 311*b* of found Brand X smartwatch Version C, second product/service information 313*b* about the found Brand X smartwatch Version C, second price/availability information 315*b* for the found Brand X smartwatch Version C, and second purchase controls 317*b*. According to aspects of the present disclosure, communication device 100 also presents second filtered product/service news display segment 309*b*, which is associated with second product/service information 313*b* and suggests an improved version of the preferred goods or service with a corresponding change in price, availability, or quality from the preferred brand that may affect a purchase decision. Specifically, example second filtered product/service news display segment 309*b* includes second authoritative source information 319*b*, a link to or excerpt from second article 321*b*, and purchase prediction summary 323*b* (e.g., "New release in two months will include 12 new features not in version B") extracted from the article. User selection, by clicking on either second authoritative source information 319*b* or link to second article 321*b* can open a separate window that provides the entire article or website from which the article originates. The user is presented with authoritative information to assist in choosing between an immediately inferior available version or a later available superior version. Price differences may also be presented. Based on this information, purchase may be made at a later time to either realize a lower price for brand B or to get the additional features of brand C. Alternatively, if an immediate need for the product is determined, the current version B may be purchased at the current price, but with foreknowledge that the price and features will be changing soon.

FIGS. 7A-7B (collectively "FIG. 7") are a flow diagram presenting method 700 for selecting and providing published reliable information articles that is contextually appropriate and authoritative to influence selection and timing of purchase of a product or service identified as being of interest to a user. The description of method 700 is provided with general reference to the specific components illustrated within the preceding FIGS. 1-6. Specific components referenced in method 700 (FIG. 7) may be identical or similar to components of the same name used in describing preceding FIGS. 1-12. In one or more embodiments, controller 120 (FIG. 1) configures communication device 100 (FIG. 1) or a similar computing device to provide the described functionality of method 700 (FIG. 7).

With reference to FIG. 7A, method 700 includes detecting, via at least one input device, at least one user input (e.g., past purchases or a product search) by a user indicating a current interest in purchasing a product or service (block 702). Method 700 includes identifying a preferred brand from among more than one brand of the product or service based on one or more previous purchases (block 704). In one or more embodiments, method 700 includes identifying alternative brand(s) to the preferred brand of the product or service (block 706). In one or more embodiments, method 700 includes identifying substitute product(s) or service(s) for the preferred product or service (block 708). Method 700 optionally includes providing an ecommerce interface for finding and purchasing a product or service (e.g., preferred, alternative or substitute) (block 710). Method 700 includes activating an electronic search to identify, in one or more published information source, at least one news article containing product or service information of price, availability and updated future version associated respectively with the preferred, alternative and substitute product(s) or service(s) (block 712). Method 700 includes identifying a corresponding summary of each of the at least one news article that is directed to one or more of: (i) current price; (ii) future price; (iii) current availability; (iv) future availability; and (v) future version of the corresponding preferred, alternative or substitute product or service results (block 714). Then method 700 proceeds to block 716 of FIG. 7B.

With reference to FIG. 7B, method 700 includes identifying one or more responsive preferred alternative and substitute product or service search results (block 716). Method 700 includes identifying the at least one article corresponding to the identified one or more responsive product or service search results (block 718). In an example, an article may be specific to the preferred brand, an alternate brand, or a substitute product that is included in the results. Method 700 includes rendering, into rendered content presented within a purchase interface, the one or more responsive product or service search results and the corresponding news article to influence timing of a purchase decision for the product or service by the user (block 720). In one or more embodiments, method 700 includes incorporating into the rendered content one or more of: (i) an image of the product or service; (ii) at least a portion of or a link to the product or service information; (iii) at least a portion or a link to the corresponding news article; and (iv) the summary and the authoritative source to the corresponding news article (block 722). Method 700 includes presenting, via the at least one output device, the rendered content (block 724). Method 700 includes opening a window containing detailed information for user selection of a link within the rendered content (block 726). Method 700 includes responding to a user selection of a buy control by triggering an ecommerce purchase (block 728). Then method 700 ends.

According to aspects of the present disclosure, the communication device 100 (FIG. 1), method 700, and computer program product, such as RSD 150 (FIG. 1), enhance a purchasing experience by providing authoritative, forward-looking and contemporaneous information (i.e., "news" articles) directed to a preferred product or service of interest to user 102 (FIG. 1). The news articles are selected and summarized when providing information about price, availability, and quality, either currently or in the future for the preferred product or service. In one or more embodiments, options for purchasing an alternative brand(s) of the good or service are also made available along with corresponding news articles. In one or more embodiments, options for purchasing substitute product(s) or service(s) are also made available along with corresponding news articles. Rather than only be provided backward looking information based on reviews of other purchasers, the present disclosure automates finding and presenting information to prevent, in many instances, buyer's remorse for making a purchase decision that is quickly shown to be unwise based on foreseeable changes in price, availability and quality.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic system comprising:
   at least one electronic device, each electronic device comprising:
   at least one input device;
   at least one output device;
   a communications subsystem; and
   a controller communicatively coupled to the at least one input device, the at least one output device and the communications subsystem, and which is configured to cause the at least one electronic device to:

detect, via the at least one input device, at least one user input by a user indicating a current interest in purchasing a product or service;

activate an electronic search to automatically identify, in one or more published information source, at least one article containing product or service information associated with the product or service, the product or service information including availability of the product or service;

determine, from the at least one article, a product sentiment including one or more of price, new upcoming models, and new upcoming technology;

determine, based on the product sentiment, whether the at least one article should be presented to the user along with product information relevant to an immediate purchase;

in response to determining that the at least one article should be presented, present, via the at least one output device, a purchase interface section indicating the product or service and at least a portion of, or a link to, the product or service information from the at least one article, to influence timing of a purchase decision for the product or service by the user; and in response to detecting user selection of the link, open a separate window that provides the entire article or website from which the article originates.

2. The electronic system of claim 1, wherein the controller configures the at least one electronic device to:

based on one or more previous purchases, identify a preferred brand from among more than one brand of the product or service; and identify the at least one article associated with a change in at least one of price and availability of the preferred brand of the product or service.

3. The electronic system of claim 1, wherein the controller configures the at least one electronic device to:

identify at least one substitute product or service; and identify the at least one article associated with at least one of price and availability of one or more of the product or service and the at least one substitute product or service.

4. The electronic system of claim 1, wherein the controller configures the at least one electronic device to:

identify a current version of the product or service that is available for purchase;

identify the at least one article associated with a future version of the product or service that will be available for purchase at a later date; and present the at least one article to influence timing of the purchase decision for the future version of the product or service at or after the later date.

5. The electronic system of claim 1, wherein the controller configures the at least one electronic device to:

identify a corresponding summary of each of the at least one article that is directed to one or more of: (i) current price of the product or service; (ii) future price of the product or service; (iii) current availability of the product or service; (iv) future availability of the product or service; and (v) future version of the product or service; and present, via the at least one output device, the at least one article with the corresponding summary.

6. The electronic system of claim 1, wherein the controller configures the at least one electronic device to:

identify a corresponding authoritative source for each of the at least one article; and present, via the at least one output device, the at least one article with the corresponding authoritative source.

7. The electronic system of claim 1, wherein the controller configures the at least one electronic device to:

detect the at least one user input by the user indicating the current interest in purchasing the product or the service, based on detecting a current product or service search;

identify one or more responsive product or service search results;

identify the at least one article for at least one of the one or more responsive product or service search results;

render the one or more responsive product or service search results along with the at least one article into rendered content; and present, via the at least one output device, the rendered content.

8. A method comprising:

detecting, via at least one input device, at least one user input by a user indicating a current interest in purchasing a product or service;

activating an electronic search to automatically identify, in one or more published information source, at least one article containing product or service information associated with the product or service, the product or service information including availability of the product or service;

determining, from the at least one article, a product sentiment including one or more of price, new upcoming models, and new upcoming technology;

determining, based on the product sentiment, whether the at least one article should be presented to the user along with product information relevant to an immediate purchase;

in response to determining that the at least one article should be presented, presenting, via at least one output device, a purchase interface section indicating the product or service and at least a portion of, or a link to, the product or service information from the at least one article, to influence timing of a purchase decision for the product or service by the user; and in response to detecting user selection of the link, opening a separate window that provides the entire article or website from which the article originates.

9. The method of claim 8, further comprising:

based on one or more previous purchases, identifying a preferred brand from among more than one brand of the product or service; and identifying the at least one article associated with a change in at least one of price and availability of the preferred brand of the product or service.

10. The method of claim 8, further comprising:

identifying at least one substitute product or service; and identifying the at least one article associated with at least one of price and availability of one or more of the product or service and the at least one substitute product or service.

11. The method of claim 8, further comprising:

identifying a current version of the product or service that is available for purchase;

identifying the at least one article associated with a future version of the product or service that will be available for purchase at a later date; and presenting the at least one article to influence timing of the purchase decision for the future version of the product or service at or after the later date.

12. The method of claim 8, further comprising:
identifying a corresponding summary of each of the at
least one article that is directed to one or more of: (i)
current price of the product or service; (ii) future price
of the product or service; (iii) current availability of the
product or service; (iv) future availability of the prod-
uct or service; and (v) future version of the product or
service; and
presenting, via the at least one output device, the at least
one article with the corresponding summary.
13. The method of claim 8, further comprising:
identifying a corresponding authoritative source for each
of the at least one article; and
presenting, via the at least one output device, the at least
one article with the corresponding authoritative source.
14. The method of claim 8, further comprising:
detecting the at least one user input by the user indicating
the current interest in purchasing the product or the
service; based on detecting a current product or service
search;
identifying one or more responsive product or service
search results;
identifying the at least one article for at least one of the
one or more responsive product or service search
results;
rendering the one or more responsive product or service
search results along with the at least one article into
rendered content; and
presenting, via the at least one output device, the rendered
content.
15. A computer program product comprising:
a computer readable storage device; and
program code on the computer readable storage device
that when executed by a processor associated with an
electronic system, the program code configures the
electronic system to provide functionality of:
detecting, via at least one input device, at least one user
input by a user indicating a current interest in pur-
chasing a product or service;
activating an electronic search to automatically iden-
tify, in one or more published information sources, at
least one article containing product or service infor-
mation associated with the product or service, the
product or service information including availability
of the product or service;
determining, from the at least one article, a product
sentiment including one or more of price, new
upcoming models, and new upcoming technology;
determining, based on the product sentiment, whether
the at least one article should be presented to the user
along with product information relevant to an imme-
diate purchase;
in response to determining that the at least one article
should be presented, presenting, via at least one
output device, a purchase interface section indicating
the product or service and at least a portion of, or a
link to, the product or service information from the
at least one article, to influence timing of a purchase
decision for the product or service by the user; and
in response to detecting user selection of the link,
opening a separate window that provides the entire
article or website from which the article originates.

16. The computer program product of claim 15, wherein
the program code configures the electronic system to pro-
vide functionality of:
based on one or more previous purchases, identifying a
preferred brand from among more than one brand of the
product or service; and
identifying the at least one article associated with a
change in at least one of price and availability of the
preferred brand of the product or service.
17. The computer program product of claim 15, wherein
the program code configures the electronic system to pro-
vide functionality of:
identifying at least one substitute product or service; and
identifying the at least one article associated with at least
one of price and availability of one or more of the
product or service and the at least one substitute
product or service.
18. The computer program product of claim 15, wherein
the program code configures the electronic system to pro-
vide functionality of:
identifying a current version of the product or service that
is available for purchase;
identifying the at least one article associated with a future
version of the product or service that will be available
for purchase at a later date; and
presenting the at least one article to influence timing of the
purchase decision for the future version of the product
or service at or after the later date.
19. The computer program product of claim 15, wherein
the program code configures the electronic system to pro-
vide functionality of:
identifying a corresponding summary of each of the at
least one article that is directed to one or more of: (i)
current price of the product or service; (ii) future price
of the product or service; (iii) current availability of the
product or service; (iv) future availability of the prod-
uct or service; and (v) future version of the product or
service;
identifying a corresponding authoritative source for each
of the at least one article; and
presenting, via the at least one output device, the at least
one article with the corresponding summary and with
the corresponding authoritative source.
20. The computer program product of claim 15, wherein
the program code configures the electronic system to pro-
vide functionality of:
detecting the at least one user input by the user indicating
the current interest in purchasing the product or the
service; based on detecting a current product or service
search;
identifying one or more responsive product or service
search results;
identifying the at least one article for at least one of the
one or more responsive product or service search
results;
rendering the one or more responsive product or service
search results along with the at least one article into
rendered content; and
presenting, via the at least one output device, the rendered
content.

\* \* \* \* \*